US012118930B2

(12) United States Patent
Huang et al.

(10) Patent No.: US 12,118,930 B2
(45) Date of Patent: Oct. 15, 2024

(54) DRIVE CIRCUIT, DISPLAY DEVICE, AND DEBUGGING METHOD

(71) Applicant: HKC CORPORATION LIMITED, Shenzhen (CN)

(72) Inventors: Xueyong Huang, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/145,214

(22) Filed: Dec. 22, 2022

(65) Prior Publication Data

US 2023/0360596 A1 Nov. 9, 2023

(30) Foreign Application Priority Data

May 6, 2022 (CN) ......................... 202210486615.4

(51) Int. Cl.
*G09G 3/3208* (2016.01)

(52) U.S. Cl.
CPC ... *G09G 3/3208* (2013.01); *G09G 2320/0233* (2013.01); *G09G 2320/043* (2013.01); *G09G 2320/0686* (2013.01)

(58) Field of Classification Search
CPC ......... G09G 3/3208; G09G 2320/0233; G09G 2320/043; G09G 2320/0686
See application file for complete search history.

(56) References Cited

U.S. PATENT DOCUMENTS

| | | | | |
|---|---|---|---|---|
| 2008/0170064 A1* | 7/2008 | Lee | G09G 3/3677 | 345/87 |
| 2016/0012768 A1* | 1/2016 | In | G09G 3/3225 | 345/82 |
| 2017/0047001 A1* | 2/2017 | Shin | G09G 3/3275 | |
| 2017/0140705 A1* | 5/2017 | Xu | G09G 3/3258 | |
| 2020/0135112 A1* | 4/2020 | Zhang | G09G 3/3233 | |
| 2021/0027704 A1* | 1/2021 | Tong | G09G 3/3225 | |
| 2021/0202676 A1* | 7/2021 | Jeong | G09G 3/3266 | |
| 2021/0304677 A1* | 9/2021 | Yang | G09G 3/3258 | |

(Continued)

FOREIGN PATENT DOCUMENTS

| | | |
|---|---|---|
| CN | 104867455 A | 8/2015 |
| CN | 106297665 A | 1/2017 |

(Continued)

*Primary Examiner* — Amare Mengistu
*Assistant Examiner* — Jennifer L Zubajlo
(74) *Attorney, Agent, or Firm* — Maier & Maier, PLLC

(57) ABSTRACT

A drive circuit, a display device, and a debugging method. The drive circuit is coupled to a display panel, the display panel includes a plurality of display regions, and the drive circuit includes a plurality of compensation sub-circuits. The plurality of compensation sub-circuits are coupled to the plurality of display regions in a one-to-one corresponding manner through traces, and each of the compensation sub-circuits is configured to output a voltage determined based on a wire resistance of the trace to the corresponding display region through the traces. The display panel is configured as a plurality of display regions, and each display region is coupled to one drive circuit through one single trace, such that the compensation sub-circuits can apply different voltages to the display regions, and the voltages are determined based on wire resistances of the traces.

11 Claims, 7 Drawing Sheets

(56) References Cited

U.S. PATENT DOCUMENTS

| | | | | | |
|---|---|---|---|---|---|
| 2021/0366384 | A1* | 11/2021 | Yu | G09G 3/3266 | |
| 2022/0320145 | A1* | 10/2022 | Liu | H01L 27/124 | |
| 2023/0138235 | A1* | 5/2023 | Xu | G09G 3/20 | 345/694 |

FOREIGN PATENT DOCUMENTS

| | | | | | |
|---|---|---|---|---|---|
| CN | 108389880 | A | * | 8/2018 | G09G 3/3225 |
| CN | 110249430 | A | | 9/2019 | |
| CN | 112201165 | A | * | 1/2021 | G09F 9/30 |
| CN | 212587197 | U | * | 2/2021 | G09G 3/20 |
| CN | 113035927 | A | | 6/2021 | |
| CN | 113450735 | A | | 9/2021 | |
| JP | 2005157300 | A | | 6/2005 | |
| TW | 201921332 | A | * | 6/2019 | |

* cited by examiner

DRIVE CIRCUIT, DISPLAY DEVICE, AND DEBUGGING METHOD

CROSS-REFERENCE TO RELATED APPLICATION

Pursuant to 35 U.S.C. § 119 and the Paris Conversion, this application claims priority to Chinese Patent Application No. 202210486615.4 filed May 6, 2022, the entire contents of which are incorporated herein by reference.

TECHNICAL FIELD

The present disclosure relates to the technical field of display, and in particular, to a drive circuit, a display device, and a debugging method.

BACKGROUND

With the development of the field of liquid crystal display, organic light-emitting diode (OLED) display has been gradually widely used in TV, cell phones, notebooks, etc., due to the advantages of the OLED display including self-luminescence, thin and light. However, the OLED display in the prior art has the problem of non-uniformity of displaying, which needs to be urgently resolved.

SUMMARY

The present disclosure provides a drive circuit, a display device, and a debugging method, to solve the problem of non-uniformity of displaying of the OLED display in the prior art.

According to a first aspect, an embodiment of the present disclosure provides a drive circuit, applied to a display panel that includes a plurality of display regions, where the drive circuit includes a plurality of compensation sub-circuits, the plurality of compensation sub-circuits are coupled to the plurality of display regions in a one-to-one corresponding manner through traces, and configured to output, to the corresponding display regions through the traces, voltages determined based on wire resistances of the traces.

In a preferable embodiment, the plurality of display regions are sequentially arranged in an arrangement direction from the display panel to the drive circuit; and the voltages outputted by the plurality of compensation sub-circuits to the plurality of display regions decrease gradually along the arrangement direction.

In a preferable embodiment, the drive circuit further includes: a drive sub-circuit, where the drive sub-circuit includes:

a first switch, where a control terminal and an input terminal of the first switch serve as a drive control signal input terminal and a data input terminal of the drive sub-circuit respectively;

a second switch, where an output terminal of the second switch is coupled to the plurality of compensation sub-circuits; and a capacitor, where one terminal of the capacitor is coupled to an input terminal of the second switch to serve as a drive voltage output terminal of the drive sub-circuit, and the other terminal of the capacitor is coupled to an output terminal of the first switch and a control terminal of the second switch.

In a preferable embodiment, the compensation sub-circuit includes: a resistor, where one terminal of the resistor is coupled to the corresponding display region, and the other terminal of the resistor is coupled to the drive voltage output terminal of the drive sub-circuit, and a sum of the wire resistance of the trace between the resistor and the corresponding display region and a resistance of the resistor is a set value or is in a set value range.

In a preferable embodiment, the compensation sub-circuit includes:

a first switch, where a control terminal and an input terminal of the first switch serve as a drive control signal input terminal and a data input terminal of the drive sub-circuit respectively;

a second switch, where an output terminal of the second switch is coupled to the plurality of compensation sub-circuits; and a capacitor, where one terminal of the capacitor is coupled to an input terminal of the second switch to serve as a drive voltage output terminal of the drive sub-circuit, and the other terminal of the capacitor is coupled to an output terminal of the first switch and a control terminal of the second switch;

where a voltage of the drive voltage output terminal of each compensation sub-circuit is determined based on the wire resistance of the corresponding trace.

In a preferable embodiment, the plurality of display regions have a same width in the arrangement direction; the wire resistance of the trace between the display region, which is closest to the drive circuit, and the corresponding compensation sub-circuit is R1, and the voltage outputted by the compensation sub-circuit corresponding to the n-th display region in the arrangement direction is K*n, where K is a first proportional coefficient related to R1.

In a preferable embodiment, the compensation sub-circuit includes: a resistor, coupled between the corresponding display region and the drive voltage output terminal; and a resistance of the resistor is X*Rn/I, where X is a second proportional coefficient related to R, Rn is a wire resistance value corresponding to the n-th display region sequentially arranged in a direction away from the drive circuit, and I is a current flowing through the resistor.

According to a second aspect, an embodiment of the present disclosure provides a display device, including a display panel and a drive circuit, where the display panel includes a plurality of display regions, the drive circuit includes a plurality of compensation sub-circuits, the plurality of compensation sub-circuits are coupled to the plurality of display regions in a one-to-one corresponding manner through traces and configured to output voltages determined based on wire resistances of the traces to the corresponding display regions through the traces.

According to a third aspect, an embodiment of the present disclosure provides a driving method for a display device, where the display device includes a display panel and a drive circuit, the display panel includes a plurality of display regions, the drive circuit includes a plurality of compensation sub-circuits, and the plurality of compensation sub-circuits are coupled to the plurality of display regions in a one-to-one corresponding manner through traces; the driving method includes:

outputting different voltages by the plurality of compensation sub-circuits based on wire resistances of the corresponding traces; and inputting the voltages to the corresponding display regions through the traces, where each of the plurality of display regions is lighted up under the voltage.

According to a fourth aspect, an embodiment of the present disclosure provides a debugging method for a display device, where the display device includes a display panel and a drive circuit, the display panel includes a plurality of display regions, the drive circuit includes a plurality of compensation sub-circuits, and the plurality of compensation sub-circuits are coupled to the plurality of display regions in a one-to-one corresponding manner through traces; and the debugging method includes:

obtaining wire resistance parameters, where the wire resistance parameters include wire resistance values of the traces or proportional coefficients having a set correlation with the wire resistance values;

generating output voltages corresponding to the traces according to the wire resistance parameters; and debugging outputs of the corresponding compensation sub-circuits according to the output voltages corresponding to the traces.

It can be learned from the foregoing technical solutions that, the present disclosure provides a drive circuit, a display device, and a debugging method. The display panel is configured as a plurality of display regions, and each display region is coupled to a drive circuit through one single trace, such that compensation sub-circuits in the drive circuit can apply different voltages to the display regions and the voltages are determined based on wire resistances of the traces. In this way, uniformity of the brightness of the OLED display panel can be realized by controlling the output voltages, the impact on the brightness of the panel caused by different wire resistances can be eliminated.

BRIEF DESCRIPTION OF THE DRAWINGS

In order to describe the technical solutions in the embodiments of the present disclosure or in the related art more clearly, the accompanying drawings required for describing the embodiments or the related art are briefly described hereinafter. Apparently, the accompanying drawings in the following description show some embodiments of the present disclosure, and a person of ordinary skill in the art may still derive other accompanying drawings from these accompanying drawings without paying creative labors.

DETAILED DESCRIPTION OF THE EMBODIMENTS

To make the to-be-resolved technical problems, the technical solutions, and the beneficial effects of the present disclosure clearer, the present disclosure is described in further detail below with reference to the accompanying drawings and embodiments. Understandably, the specific embodiments described herein are merely intended to explain the present disclosure but not to limit the present disclosure.

Moreover, the terms such as "first" and "second" are used only for the purpose of description and should not be construed as indicating or implying a relative importance, or implicitly indicating a quantity of indicated technical features. Thus, features defined with "first" and "second" may explicitly or implicitly include one or more of the features. In the description of the present disclosure, "a plurality of" means two or more, unless otherwise specifically defined. It should be noted that, the drive circuit, display device, and debugging method of the present disclosure are applicable to the technical field of display, and also applicable to any fields other than the technical field of display. The application fields of the drive circuit, display device, and debugging method of the present disclosure are not limited.

First Embodiment

Figure 1:
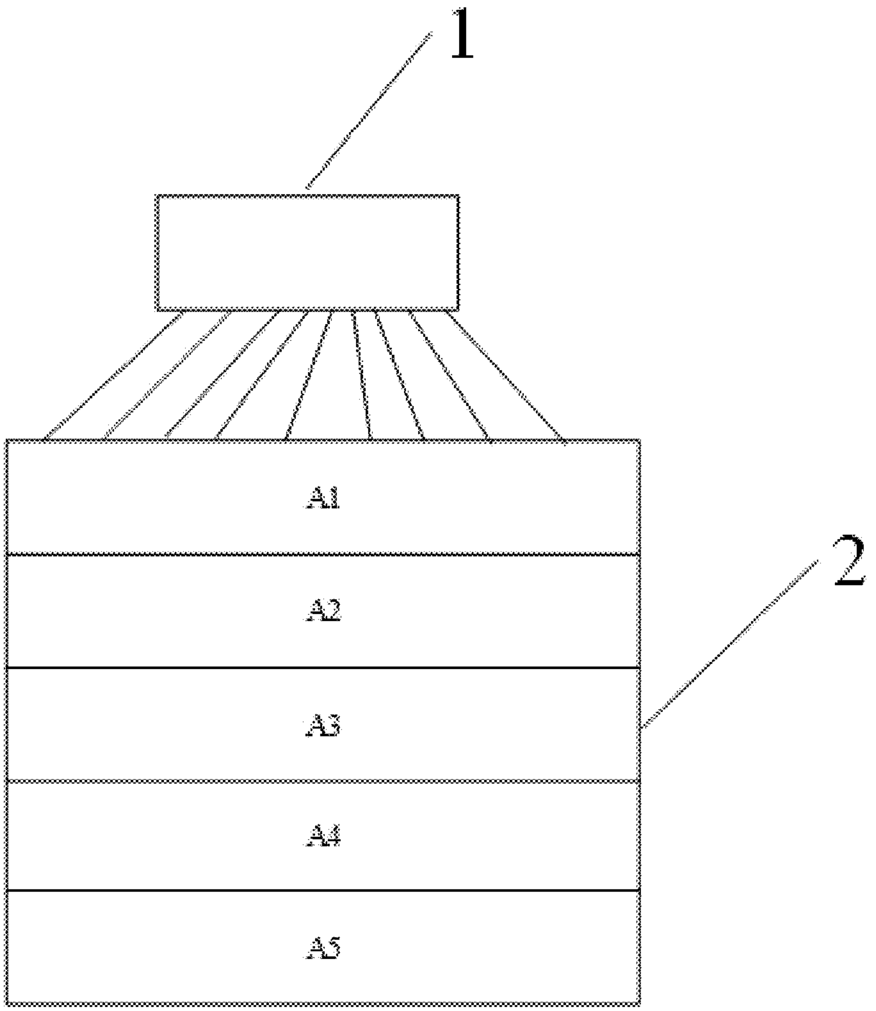
FIG. 1 is a schematic structural diagram of a drive circuit and a display panel according to an embodiment of the present disclosure.

FIG. 1 is a schematic structural diagram of a drive circuit and a display panel according to an embodiment of the present disclosure. A drive circuit 1 provided by this embodiment is configured to drive a display panel 2 including a plurality of display regions (A1, A2, A3, A4, and A5) to display, that is, input drive voltages to the display regions through traces. The value of the drive voltage influences the value of a current flowing through an organic light-emitting material in the display region. Therefore, with a higher drive current, the organic light-emitting material has higher brightness.

Figure 2:
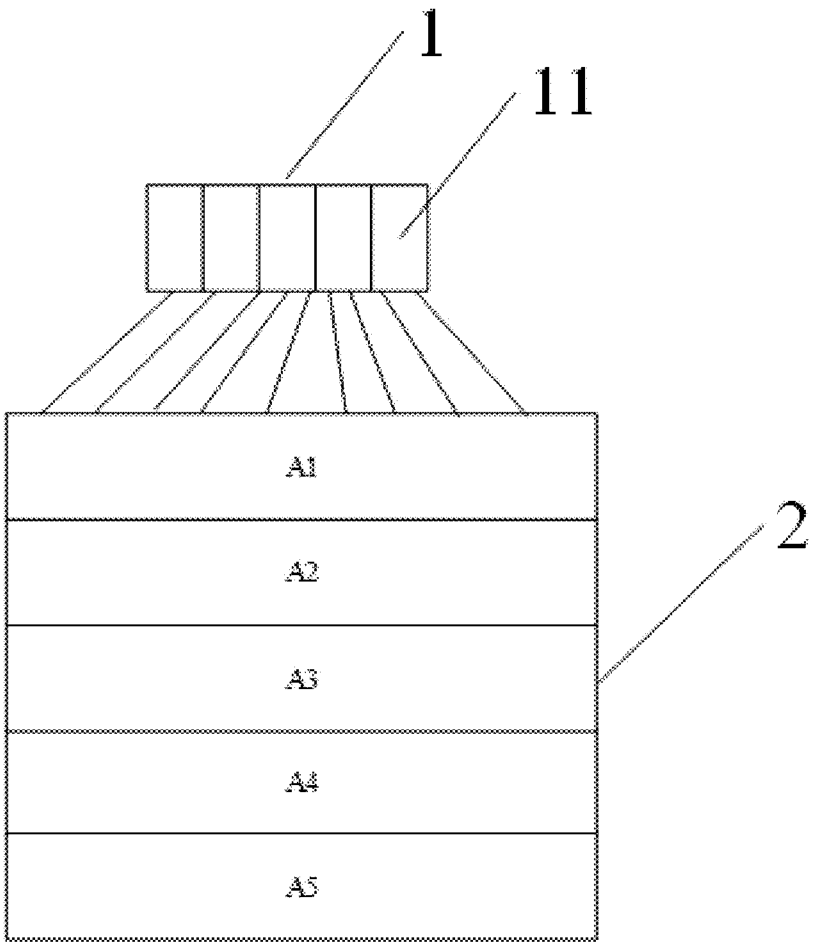
FIG. 2 is a schematic structural diagram of a drive circuit and a display panel according to an embodiment of the present disclosure.

As shown in FIG. 2, the drive circuit in this embodiment includes a plurality of compensation sub-circuits 11. The plurality of compensation sub-circuits 11 are coupled to the display regions in a one-to-one corresponding manner through traces. The compensation sub-circuit 11 is configured to output, to the corresponding display region through the trace, a voltage determined based on a wire resistance of the trace. In this embodiment, compensation sub-circuits in the drive circuit can apply different voltages to the display regions and the voltages are determined based on wire resistances of the traces. In this way, the uniformity of brightness of the organic light-emitting diode (Organic Light-Emitting Diode, OLED) display panel can be realized by controlling the output voltages, and the impact on the brightness of the panel caused by different wire resistances can be eliminated.

For example, the display panel is partitioned into a display region A1, a display region A2, a display region A3, a display region A4, and a display region A5. If the display region A1 is connected to a trace 1 (not shown in the figure), the display region A2 is connected to a trace 2 (not shown in the figure), the display region A3 is connected to a trace 3 (not shown in the figure), the display region A4 is connected to a trace 4 (not shown in the figure), and the display region A5 is connected to a trace 5 (not shown in the figure), the trace 1 to the trace 5 are all coupled to the drive circuit. Each of the traces 1 to 5 is coupled to one compensation sub-circuit, and each compensation sub-circuit is configured to output a voltage through the trace.

For example, based on material requirements or limitations, the traces of the plurality of display regions may have different wire resistances. For example, in a scenario, a cross-sectional diameter of the trace of one of the display regions may be increased due to a structural requirement to improve the toughness, and a cross-sectional diameter of the trace of another display region needs to be reduced due to space restrictions to reduce the space occupied by the trace. It may be understood that, traces with different cross sections have different wire resistances, and traces made of different materials also have different wire resistances.

For example, the present disclosure provides a foldable screen, and a joint between the display regions 2 and 3 is a "crease" of the foldable screen. In this case, the toughness of the trances of the display regions 2 and 3 needs to be enhanced, such that the display regions 2 and 3 have lower wire resistances while all the traces are made of the same material, and have higher brightness under the same drive voltage.

It may be understood that, the foregoing describes an example in which the display panel is partitioned into five display regions. It is clear to a person skilled in the art that the foregoing embodiment is merely used as an example, and there may be two, three or ten display regions in the present disclosure. A person skilled in the art can set any quantity of display regions based on actual situations and required precision, and details are not described in detail herein.

It may be understood that, in the present disclosure, the plurality of compensation sub-circuits are coupled to the plurality of display regions in a one-to-one corresponding manner through traces. That is, one compensation sub-circuit is coupled to one display region through one single trace, and the compensation sub-circuit forms a unique mapping relationship with the independent trace and the display region.

It is clear to a person of ordinary skill in the art that, "coupling" may be a direct or an indirect electrical connection. For example, if A is coupled to B, A may be electrically connected to B directly, or A may be electrically connected to B through C, which is not limited in the present disclosure.

In the present disclosure, the output voltage of each compensation sub-circuit is determined based on the wire resistance of the corresponding trace. It can be learned from the foregoing embodiment that, as a simple example, the embodiment of the present disclosure can provide a high voltage in the case of a low wire resistance, and provide a low voltage in the case of a high wire resistance, thereby balancing the brightness of each display region.

It is well known in the art that, in a specific scenario, determining the output voltage based on the wire resistance of the trace is implemented in a manner that does not hinder the technical effect. For example, after reading the present disclosure, in order to achieve the technical effect of uniform brightness, a person skilled in the art will not provide a low voltage in the case of a low wire resistance or provide a high voltage in the case of a high wire resistance. Therefore, in the present disclosure, although the output voltage is determined based on the wire resistance of the trace, it by no means follows a random rule; instead, the output voltage is determined based on a rule within the knowledge of a person skilled in the art.

The drive circuit provided by this embodiment of the present disclosure is configured to drive displaying of an OLED display panel with at least two (i.e., a plurality of) panel regions. That is, the drive circuit is applicable to an OLED display panel. A light-emitting structure (OLED element) of the OLED display panel includes: a cathode, an electron injection layer (EIL), an electron transport layer (Electron Transport Layer, ETL), a light-emitting layer (EL), a hole transport layer (Hole Transport Layer, HTL), a hole injection layer (Hole Injection Layer, HIL), and an anode. During practical application of this embodiment of the present disclosure, a trace may be coupled to the light-emitting element. Under the driving of a certain voltage, electrons and holes are injected into the electron transport layer and the hole transport layer from the cathode and the anode respectively. The electrons and the holes are migrated to the light-emitting layer through the electron transport layer and the hole transport layer, and come into contact with each other in the light-emitting layer to form excitons, such that the light-emitting material in the light-emitting layer is excited to emit visible light.

In an optional embodiment, the plurality of display regions may be arranged in a direction facing toward the drive circuit. That is, the arrangement direction is from the display panel to the drive circuit, and in the direction facing towards the drive circuit, the output voltages of the compensation sub-circuits coupled to the display regions decrease gradually. In the drive architecture of the panel shown in FIG. 2, resistances of wire resistors on the side of the schematic panel increase gradually, and the DC attenuation causes drive voltages to decrease gradually. Therefore, the display regions may be arranged in a direction facing towards the drive circuit. In this way, since in-plane wire resistances of the display regions increase continuously, the display regions are arranged along an increasing direction or a decreasing direction of the wire resistances. In this way, the same display region can be driven by the same voltage to ensure the uniformity of the brightness. Since the rule of the wire resistances of different display regions can be controlled by using voltages, in the direction facing toward the drive circuit, the output voltages of the compensation sub-circuits coupled to the display regions decrease gradually, thereby eliminating the impact of the wire resistances.

Figure 3:
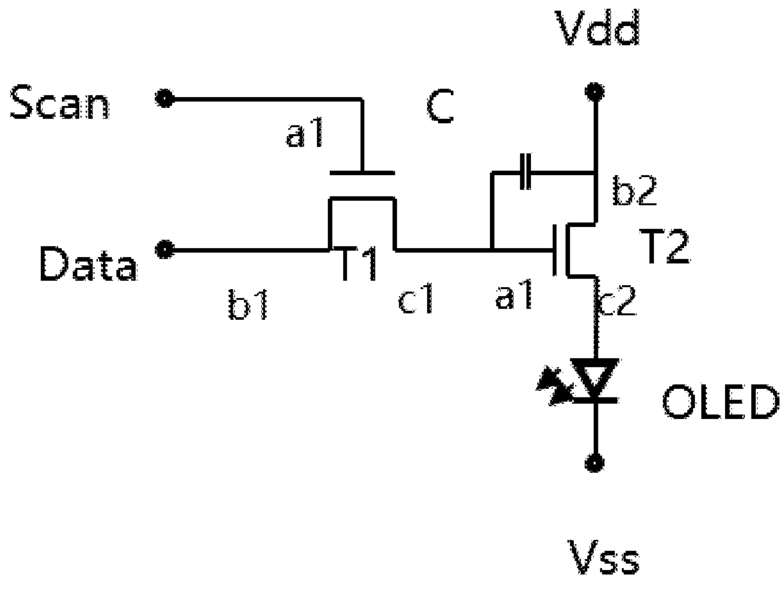
FIG. 3 is a schematic diagram of a specific structure of a drive circuit according to an embodiment of the present disclosure.

During specific implementation, as shown in FIG. 3, the drive circuit further includes: a drive sub-circuit. The drive sub-circuit includes: a first switch T1, with a control terminal (pin a1 of T1) coupled to the drive control signal input terminal Scan, and an input terminal (pin b1 of T1) coupled to the data input terminal Data; a second switch T2, with a control terminal (pin a2 of T2) coupled to an output terminal (pin c1 of T1) of the first switch, an input terminal (pin b2 of T2) coupled to the drive voltage output terminal Vdd, and an output terminal (pin c2 of T2) coupled to each compensation sub-circuit (not shown in the figure); and a capacitor C, with one terminal coupled to an output trace of the drive voltage output terminal Vdd, and the other terminal coupled to a trace between the output terminal of the first switch (pin c1 of T1) and the control terminal of the second switch (pin a2 of T2).

It can be understood that, as shown in FIG. 3, the control terminal (pin a1 of T1) and the input terminal (pin b1 of T1) of the first switch T1 serve as the drive control signal input terminal Scan and the data input terminal Data of the drive sub-circuit; one terminal of the capacitor C is coupled to the input terminal of the second switch T2 (pin b2 of T2) to serve as the drive voltage output terminal Vdd of the drive sub-circuit.

The drive sub-circuit in this embodiment is an improvement based on the drive circuit in the prior art. The drive voltage output terminal is the drive voltage in the prior art, and in this structure, the compensation sub-circuit is coupled between the drive sub-circuit and the display panel. That is, the compensation sub-circuit is coupled between pin c2 of T2 and OLED in FIG. 3.

For example, the resistor may alternatively be coupled to a wire where the drive voltage output terminal is located. That is, in this structure, the compensation sub-circuit is coupled to an output wire of the Vdd terminal in FIG. 3. The output wire is further coupled to the capacitor C and is coupled to the b2 terminal of the second switch T2. In this way, the compensation sub-circuit is configured on a flexible printed circuit board (FPCB), which provides diversified options for the configuration of the compensation sub-circuit.

Figure 7:
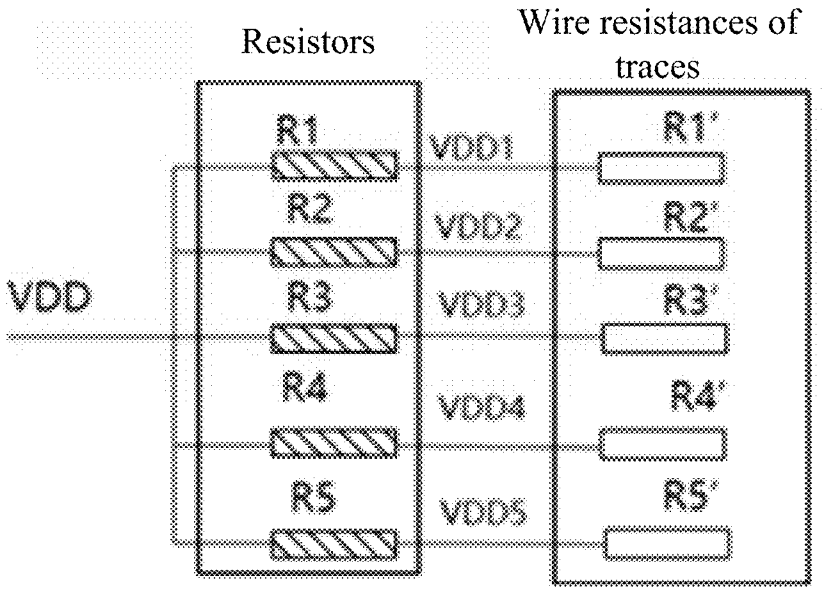
FIG. 7 is a schematic diagram of a circuit relationship between a drive circuit and a display panel according to an embodiment of the present disclosure.

In addition, in an optional embodiment, as shown in FIG. 7, the compensation sub-circuit includes: a resistor (R1, R2, R3, R4, or R5), coupled to the trace between the corresponding display region and the drive voltage output terminal. A sum of a resistance of the resistor and the wire resistance (R1', R2', R3' R4' or R5') of the corresponding trace is a set value or within a set value range. In this embodiment, the wire resistances corresponding to the display regions are balanced by using the resistors of the compensation sub-circuits, so that the same drive voltage is divided by connection to different resistors in coordination with the wire resistance, so that uniform voltage is inputted to each display region.

In an embodiment not shown in the figure, a plurality of drive voltage output terminals may be configured. In this embodiment, a terminal voltage value of the drive voltage output terminal can be adjusted directly. Therefore, it is unnecessary to set a resistor. In this embodiment, each compensation sub-circuit includes: a drive voltage output terminal, a data input terminal, and a drive control signal input terminal; a first switch, with a control terminal coupled to the drive control signal input terminal, and an input terminal coupled to the data input terminal; a second switch, with a control terminal coupled to an output terminal of the first switch, an input terminal coupled to the drive voltage output terminal, and an output terminal coupled to each drive sub-circuit; and a capacitor, with one terminal coupled to an output trace of the drive voltage output terminal, and the other terminal coupled to a trace between the output terminal of the first switch and the control terminal of the second switch. A voltage of the drive voltage output terminal of the compensation sub-circuit is determined based on a wire resistance of the corresponding trace.

It may be understood that, in the foregoing embodiment not shown in the figure, the first switch, the second switch, and their connection relationships with the capacitor are similar to those in the embodiment shown in FIG. 3, and details are not described herein.

Figure 4:
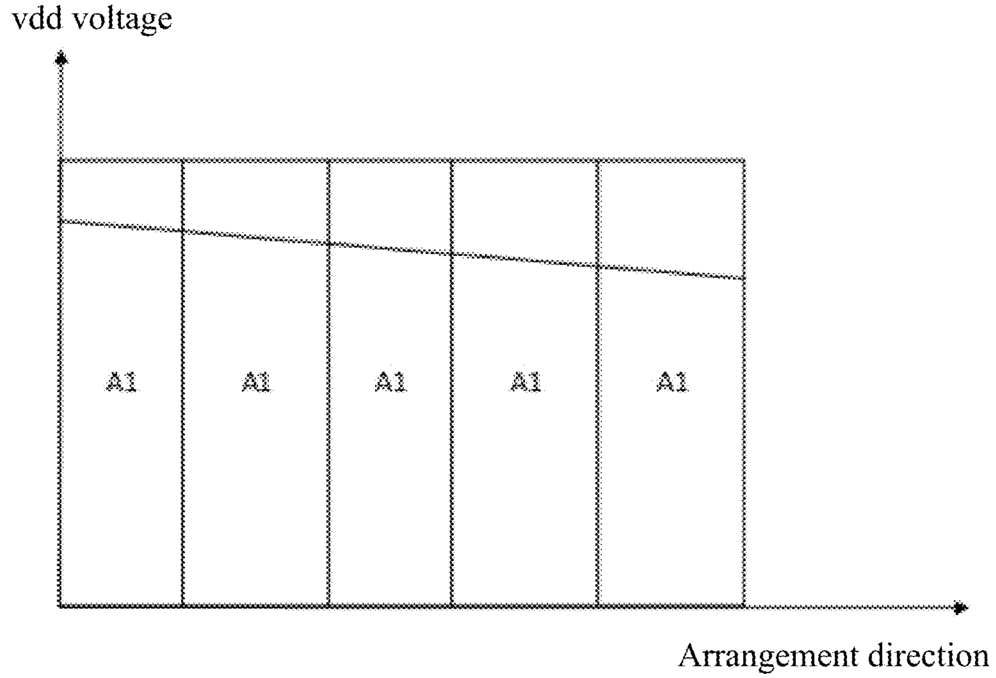
FIG. 4 shows a VDD voltage attenuation curve of a display panel according an embodiment of the present disclosure.
Figure 5:
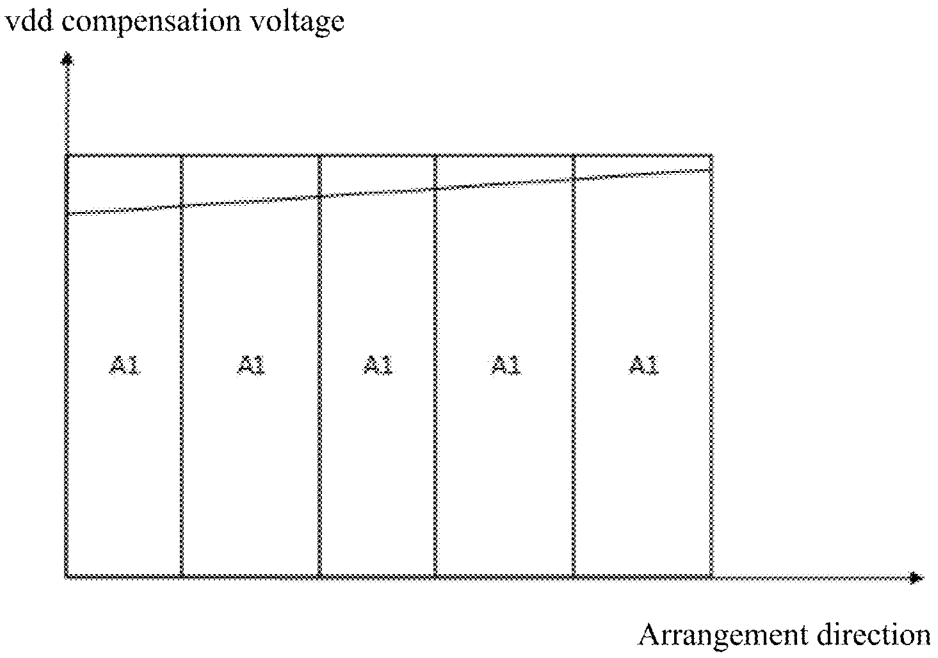
FIG. 5 shows a VDD compensation voltage curve of a display panel according an embodiment of the present disclosure.
Figure 6:
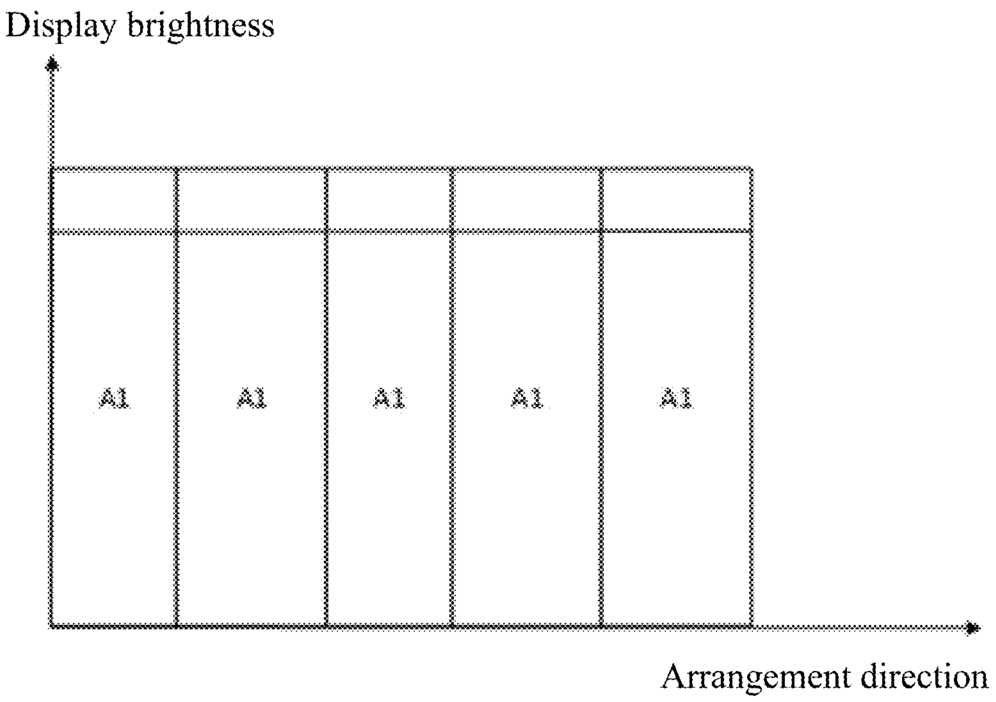
FIG. 6 shows a brightness curve with compensation using different voltages after partitioning of the display panel according an embodiment of the present disclosure.

The output voltage of the compensation sub-circuit in the present disclosure is described in detail below. FIG. 4 is a schematic diagram of VDD voltage attenuation. Due to the presence of the wire resistance, in a regular scenario, the display region farther away from the drive circuit has a longer trace, and thus the wire resistance is higher. Therefore, VDD inputted to the display region is lower. FIG. 5 shows a voltage curve of the output voltages of the compensation sub-circuits. FIG. 6 shows a voltage curve of the display regions after the attenuation curve in FIG. 4 is compensated with reference to the compensation voltage curve shown in FIG. 5. It can be seen that, the compensation method in this embodiment of the present disclosure can make the brightness of each display region to be uniformed, thereby optimizing the display panel.

In combination with the foregoing attenuation curve, this embodiment provides a specific method for determining the output voltage of the compensation sub-circuit. In this embodiment, each display region has a same width in the direction facing towards the drive circuit. The wire resistance of the trace between the display region closest to the drive circuit and the corresponding compensation sub-circuit is R1, and the voltage outputted by the compensation sub-circuit corresponding to the n-th display region in the arrangement direction is $K_n$*n, where $K_n$ is a first proportional coefficient corresponding to the n-th display region and related to R1. Based on the specific method for determining the output voltage of the compensation sub-circuit in this embodiment, it can be seen from the VDD attenuation curve that, a longer trace (with a longer distance to the drive circuit) corresponds to higher voltage attenuation. By setting a proportional coefficient related to R1, there is no need to measure each wire resistance, which avoids the difficulty in measurement due to inconvenient measurement of the wire resistance. $K_n$ is correlated to R1, and each region has the same width. Assuming that each $K_n$ has the same value, R2 is two times of R1, R3 is three times of R1, and so on. Therefore, if R1 is replaced with $K_n$, it only needs to configure the compensation voltage of the first display region as a multiple of $K_n$, the compensation voltage of the second display region as a multiple of $2K_1$, and so on. In this way, the compensation voltage can be obtained, and it is unnecessary to measure R1 to R5.

Further, an optimal compensation voltage can be obtained by setting a rational value of K. For example, the brightness of the display screen may be detected by an electronic device, and then ultimate brightness is adjusted by adjusting the value of K. When the brightness of the display screen is excessively high, the output voltage can be reduced by reducing the value of K, thereby reducing the brightness of each display region at an equal proportion to maintain the uniformity of the brightness of the entire display screen.

In a preferable embodiment, as shown in FIG. 7, the compensation sub-circuit includes: a resistor, coupled to the trace between the corresponding display region and the drive voltage output terminal. A resistance of each resistor is X*Rn/I, where X is a second proportional coefficient, Rn is a wire resistance value corresponding to the n-th display region sequentially arranged in a direction away from the drive circuit, and I is a current flowing through the resistor. In this embodiment, the resistance of the resistor of the compensation sub-circuit is X*Rn/I. In this way, by setting the proportional coefficient X, different drive voltages can be outputted with a fixed resistor. For example, with a larger value of X, the resistance of the resistor is larger, and the corresponding drive voltage is higher. Alternatively, with a fixed resistance of the resistor, a larger value of X corresponds to a lower current flowing through the resistor. In this case, according to the definition that V=I(Rn+resistance of the resistor), if the value of (Rn+resistance of the resistor) remains fixed, the drive voltage decreases.

For example, as shown in FIG. 7, the resistors in the compensation sub-circuits are R1, R2, R3, R4, and R5. Accordingly, wire resistances of the traces corresponding to the display regions (that is, the in-plane resistors) are R1', R2', R3', R4', and R5'. The voltage outputted by the compensation sub-circuit corresponding to R1 is VDD1, the voltage outputted by the compensation sub-circuit corresponding to R2 is VDD2, and VDD3, VDD4, and VDD5 are outputted in the same manner. It can be seen that, VDD1 to VDD5 are all obtained through the VDD drive voltage. Each value of VDD1 to VDD5 is obtained based on a ratio between the compensation resistor and the in-plane resistor on the corresponding trace. For example, the value of VDD1 is: VDDR1/(R1+R1'). Other output voltages are not described in detail again.

Further, in a preferable embodiment of the present disclosure, automatic adjustment based on actual situations can be implemented. For example, a microcontroller unit (MCU) may be configured in the drive circuit. The MCU may store part of computing logic and K values or X values. The MCU can acquire the drive voltage value and brightness value of each display region synchronously or asynchronously. In combination with daily scenes, when an excessively high brightness value is recognized, the drive voltage can be reduced by reducing the K value. Details are not described again herein in the present disclosure.

It can be learned that, in the present disclosure, the display panel is configured as a plurality of display regions, and each display region is coupled to a drive circuit through one single trace, such that compensation sub-circuits in the drive circuit apply different voltages to the display regions and the voltages are determined based on wire resistances of the traces. In this way, uniformity of the brightness of the OLED display panel can be realized by controlling the output voltages, and the impact on the brightness of the panel caused by different wire resistances can be eliminated.

Second Embodiment

A display device in this embodiment of the present disclosure includes a display panel and a drive circuit, where the display panel includes a plurality of display regions, the drive circuit includes a plurality of compensation sub-circuits that are in a one-to-one correspondence with the plurality of display regions. Each display region is coupled to the corresponding compensation sub-circuit through a trace. A voltage outputted by each compensation sub-circuit is determined based on a wire resistance of the corresponding trace.

During specific implementation, the display device provided by this embodiment of the present disclosure may be any product or component with a display function, such as a mobile phone, a tablet computer, a TV, a display, a notebook computer, a digital photo frame, or a navigator.

It can be learned that, in the present disclosure, the display panel is configured as a plurality of display regions, and each display region is coupled to a drive circuit through one single trace, such that compensation sub-circuits in the drive circuit apply different voltages to the display regions and the voltages are determined based on wire resistances of the traces. In this way, the uniformity of the brightness of the OLED display panel can be realized by controlling the output voltages, and the impact on the brightness of the panel caused by different wire resistances can be eliminated.

Third Embodiment

Figure 8:
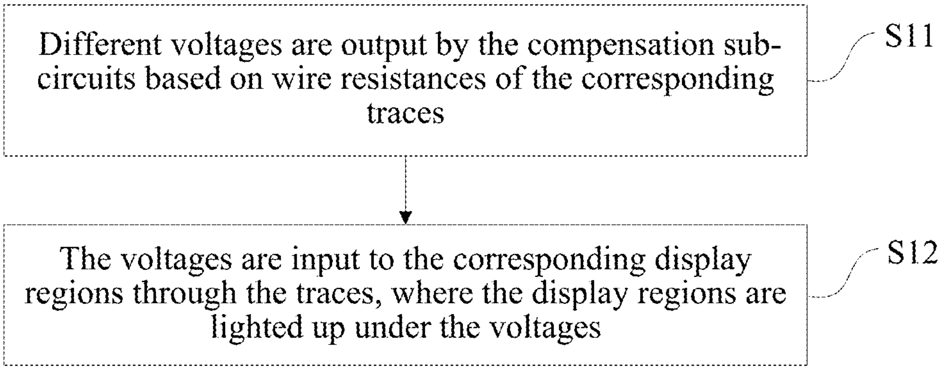
FIG. 8 is a schematic flowchart of a driving method for a display device according to an embodiment of the present disclosure.

FIG. 8 shows a driving method for a display device in this embodiment of the present disclosure. The display device includes a display panel and a drive circuit, the display panel includes a plurality of display regions, and the drive circuit includes a plurality of compensation sub-circuits that are in a one-to-one correspondence with the plurality of display regions. Each display region is coupled to the corresponding compensation sub-circuit through a trace. The driving method includes:

At a step of S11, different voltages are output by the plurality of compensation sub-circuits based on wire resistances of the corresponding traces.

At a step of S12, the voltages are input to the corresponding display regions through the traces, where each display region is lighted up under the voltage.

It can be learned that, in the present disclosure, the display panel is configured as a plurality of display regions, and each display region is coupled to a drive circuit through one single trace, such that compensation sub-circuits in the drive circuit apply different voltages to the display regions. The voltages are applied to the corresponding display regions to light up the display regions. In this way, the uniformity of the brightness of the OLED display panel can be realized by controlling the output voltages, and the impact on the brightness of the panel caused by different wire resistances can be eliminated.

Fourth Embodiment

Figure 9:
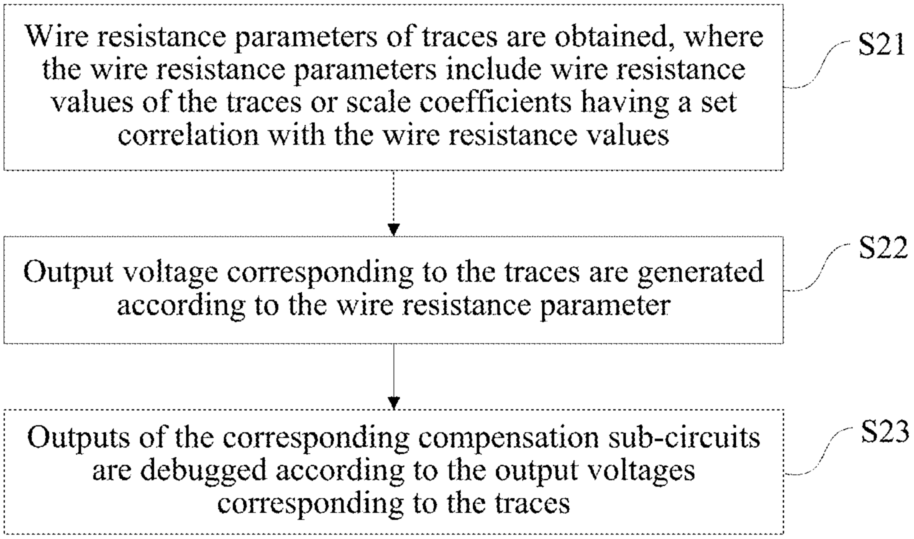
FIG. 9 is a schematic flowchart of a debugging method for a display device according to an embodiment of the present disclosure.

FIG. 9 shows a debugging method for a display device in this embodiment of the present disclosure. The display device includes a display panel and a drive circuit, the display panel includes a plurality of display regions, and the drive circuit includes a plurality of compensation sub-circuits that are in a one-to-one correspondence with the plurality of display regions. Each display region is coupled to the corresponding compensation sub-circuit through a trace. The debugging method includes:

At a step of S21, a wire resistance parameter is obtained, where the wire resistance parameter includes a wire resistance value of each trace or a proportional coefficient having a set correlation with the wire resistance value.

At a step of S22, an output voltage corresponding to each trace is generated according to the wire resistance parameter.

At a step of S23, an output of the corresponding compensation sub-circuit is debugged according to the output voltage corresponding to each trace.

Figure 10:
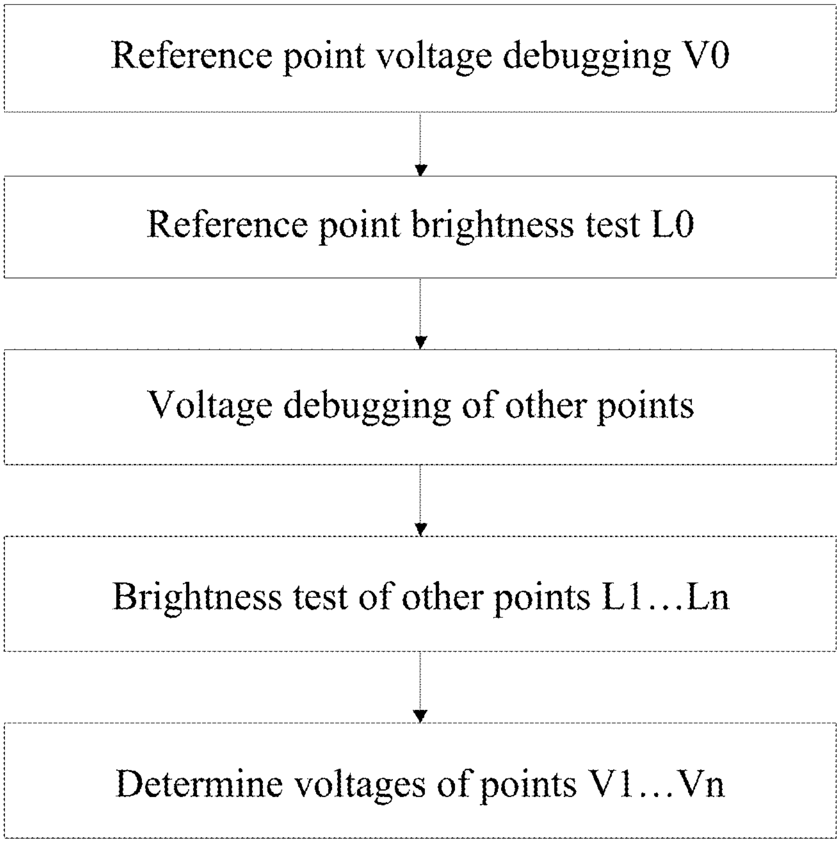
FIG. 10 is a schematic flowchart of a specific example of a debugging method according to an embodiment of the present disclosure.

Specifically, referring to the embodiment shown in FIG. 10, during specific debugging, VDD1, VDD2, VDD3 and the like are determined according to brightness in the debugging process shown in FIG. 10. When the VDD voltage is determined according to L1=L2=L3=L0, the impact of inconvenient measurement of X or K can be eliminated.

It can be seen that, by using the foregoing debugging method, the output voltage of each compensation sub-circuit can be adjusted to a required voltage value before use, and the voltage value is used as an output of each compensation sub-circuit. Therefore, in next use, because debugging of each compensation sub-circuit has been completed, the display region is driven directly. Then, the display regions are lighted up, to achieve uniform brightness of the OLED display panel, thereby avoiding the impact on the brightness of the panel due to different wire resistances.

It should be noted that, regarding the embodiment of the drive circuit, the embodiment of the display device, and the embodiments of the driving method and the debugging method thereof provided by the present disclosure, reference may be made to each other, these embodiments are not limited in the present disclosure. The debugging method for the display device according to the present disclosure may have more or less steps according to actual situations. Any alternative methods easily conceivable by a person skilled in the art within the technical scope of the present disclosure shall fall within the protection scope of the present disclosure. Therefore, details are not described herein again.

The foregoing descriptions are merely optional embodiments of the present application and are not intended to limit the present application. Any modification, equivalent replacement, and improvement, which are made within the spirit and the principle of the present application, should all be included within the protection scope of the present application.

What is claimed is:

1. A drive circuit, applied to a display panel that comprises a plurality of display regions, wherein each of the plurality of display regions is coupled to the drive circuit through one single trace, the drive circuit comprises a plurality of compensation sub-circuits, the plurality of compensation sub-circuits are coupled to the plurality of display regions in a one-to-one corresponding manner through traces, and configured to output voltages determined based on wire resistances of the traces to the corresponding display regions through the traces;

wherein the plurality of display regions have a same width in the arrangement direction from the display panel to the drive circuit, the wire resistance of the trace between the display region which is closest to the drive circuit, and the corresponding compensation sub-circuit is R1, and the voltage outputted by the compensation sub-circuit corresponding to a n-th display region in the arrangement direction is $K_n$*n, wherein $K_n$ is a first proportional coefficient that is corresponding to the n-th display region and related to R1; and wherein the drive circuit further comprises a drive sub-circuit, each compensation sub-circuit comprises a resistor coupled to the trace between the corresponding display region and a drive voltage output terminal of the drive sub-circuit, and a resistance of each resistor is X*Rn/I, wherein X is a second proportional coefficient, Rn is a wire resistance value corresponding to a n-th display region sequentially arranged in a direction away from the drive circuit, and I is a current flowing through the resistor.

2. The drive circuit according to claim 1, wherein the plurality of display regions are sequentially arranged in an arrangement direction from the display panel to the drive circuit; and the voltages outputted by the plurality of compensation sub-circuits to the plurality of display regions decrease gradually along the arrangement direction from the display panel to the drive circuit.

3. The drive circuit according to claim 1, wherein the drive sub-circuit comprises:

a first switch, wherein a control terminal and an input terminal of the first switch serve as a drive control signal input terminal and a data input terminal of the drive sub-circuit respectively;

a second switch, wherein an output terminal of the second switch is coupled to the plurality of compensation sub-circuits; and a capacitor, wherein one terminal of the capacitor is coupled to an input terminal of the second switch to serve as the drive voltage output terminal of the drive sub-circuit, and the other terminal of the capacitor is coupled to an output terminal of the first switch and a control terminal of the second switch.

4. The drive circuit according to claim 3, wherein one terminal of the resistor is coupled to the corresponding display region, and the other terminal of the resistor is coupled to the drive voltage output terminal of the drive sub-circuit, or the resistor is coupled to a wire of the drive voltage output terminal, and a sum of the wire resistance of the trace between the resistor and the corresponding display region and a resistance of the resistor is a set value or is in a set value range.

5. The drive circuit according to claim 1, wherein the compensation sub-circuit comprises:

a first switch, wherein a control terminal and an input terminal of the first switch serve as a drive control signal input terminal and a data input terminal of the drive sub-circuit respectively;

a second switch, wherein an output terminal of the second switch is coupled to the plurality of compensation sub-circuits; and a capacitor, wherein one terminal of the capacitor is coupled to an input terminal of the second switch to serve as a drive voltage output terminal of the drive sub-circuit, and the other terminal of the capacitor is coupled to an output terminal of the first switch and a control terminal of the second switch;

wherein a voltage of the drive voltage output terminal of each compensation sub-circuit is determined based on the wire resistance of the corresponding trace.

6. A display device, comprising a display panel and a drive circuit, wherein the display panel comprises a plurality of display regions, and each of the plurality of display regions is coupled to the drive circuit through one single trace, the drive circuit comprises a plurality of compensation sub-circuits, the plurality of compensation sub-circuits are coupled to the plurality of display regions in a one-to-one corresponding manner through traces and configured to output, to the corresponding display regions through the traces, voltages determined based on wire resistances of the traces;

wherein the plurality of display regions have a same width in the arrangement direction from the display panel to the drive circuit, the wire resistance of the trace between the display region which is closest to the drive circuit, and the corresponding compensation sub-circuit is R1, and the voltage outputted by the compensation sub-circuit corresponding to a n-th display region in the arrangement direction is $K_n$*n, wherein $K_n$ is a first proportional coefficient that is corresponding to the n-th display region and related to R1; and wherein the drive circuit further comprises a drive sub-circuit, each compensation sub-circuit comprises: a resistor, coupled between the corresponding display region and a drive voltage output terminal of the drive sub-circuit; and a resistance of the resistor is X*Rn/I, wherein X is a second proportional coefficient related to R, Rn is a wire resistance value corresponding to the n-th display region sequentially arranged in a direction away from the drive circuit, and I is a current flowing through the resistor.

7. The display device according to claim 6, wherein the plurality of display regions are sequentially arranged in an arrangement direction from the display panel to the drive circuit; and the voltages outputted by the plurality of compensation sub-circuits to the plurality of display regions decrease gradually along the arrangement direction from the display panel to the drive circuit.

8. The display device according to claim 6, wherein the drive sub-circuit comprises:

- a first switch, wherein a control terminal and an input terminal of the first switch serve as a drive control signal input terminal and a data input terminal of the drive sub-circuit respectively;
- a second switch, wherein an output terminal of the second switch is coupled to the plurality of compensation sub-circuits; and
- a capacitor, wherein one terminal of the capacitor is coupled to an input terminal of the second switch to serve as a drive voltage output terminal of the drive sub-circuit, and the other terminal of the capacitor is coupled to an output terminal of the first switch and a control terminal of the second switch.

9. The display device according to claim 8, wherein wherein one terminal of the resistor is coupled to the corresponding display region, and the other terminal of the resistor is coupled to the drive voltage output terminal of the drive sub-circuit, or the resistor is coupled to a wire of the drive voltage output terminal, and a sum of the wire resistance of the trace between the resistor and the corresponding display region and a resistance of the resistor is a set value or is in a set value range.

10. The display device according to claim 6, wherein the compensation sub-circuit comprises:

- a first switch, wherein a control terminal and an input terminal of the first switch serve as a drive control signal input terminal and a data input terminal of the drive sub-circuit respectively;
- a second switch, wherein an output terminal of the second switch is coupled to the plurality of compensation sub-circuits; and
- a capacitor, wherein one terminal of the capacitor is coupled to an input terminal of the second switch to serve as a drive voltage output terminal of the drive sub-circuit, and the other terminal of the capacitor is coupled to an output terminal of the first switch and a control terminal of the second switch;
- wherein a voltage of the drive voltage output terminal of each compensation sub-circuit is determined based on the wire resistance of the corresponding trace.

11. A debugging method for a display device, wherein the display device comprises a display panel and a drive circuit, the display panel comprises a plurality of display regions, and each of the plurality of display regions is coupled to the drive circuit through one single trace, the drive circuit comprises a plurality of compensation sub-circuits, and the plurality of compensation sub-circuits are coupled to the plurality of display regions in a one-to-one corresponding manner through traces, the plurality of display regions have a same width in the arrangement direction from the display panel to the drive circuit, the wire resistance of the trace between the display region which is closest to the drive circuit, and the corresponding compensation sub-circuit is R1, and the voltage outputted by the compensation sub-circuit corresponding to a n-th display region in the arrangement direction is $K_n$*n, wherein $K_n$ is a first proportional coefficient that is corresponding to the n-th display region and related to R1; the drive circuit further comprises a drive sub-circuit, each compensation sub-circuit comprises: a resistor, coupled between the corresponding display region and a drive voltage output terminal of the drive sub-circuit; and a resistance of the resistor is X*Rn/I, wherein X is a second proportional coefficient related to R, Rn is a wire resistance value corresponding to the n-th display region sequentially arranged in a direction away from the drive circuit, and I is a current flowing through the resistor; and the debugging method comprises:

- obtaining wire resistance parameters, wherein the wire resistance parameters comprise wire resistance values of the traces or proportional coefficients having a set correlation with the wire resistance values;
- generating output voltages corresponding to the traces according to the wire resistance parameters; and
- debugging outputs of the corresponding compensation sub-circuits according to the output voltages corresponding to the traces.

* * * * *